United States Patent
Ried et al.

(10) Patent No.: US 10,287,182 B2
(45) Date of Patent: May 14, 2019

(54) REGULATING METHOD FOR A WATER TREATMENT INSTALLATION USING MEASURED PARAMETERS AND CONTROL OF AN OZONISATION DEVICE

(71) Applicant: XYLEM IP MANAGEMENT S.À R.L., Senningerberg (LU)

(72) Inventors: Achim Ried, Bad Oeynhausen (DE); Arne Wieland, Minden (DE); Ivan Zhu, Cranberry Township, PA (US)

(73) Assignee: XYLEM IP MANAGEMENT S.À R.L., Luxembourg (LU)

( * ) Notice: Subject to any disclaimer, the term of this patent is extended or adjusted under 35 U.S.C. 154(b) by 82 days.

(21) Appl. No.: 15/329,822

(22) PCT Filed: May 12, 2015

(86) PCT No.: PCT/EP2015/060448
§ 371 (c)(1),
(2) Date: Jan. 27, 2017

(87) PCT Pub. No.: WO2016/015888
PCT Pub. Date: Feb. 4, 2016

(65) Prior Publication Data
US 2018/0215631 A1   Aug. 2, 2018

(30) Foreign Application Priority Data
Jul. 28, 2014   (DE) .................. 10 2014 010 946

(51) Int. Cl.
*C02F 3/00*      (2006.01)
*C02F 1/00*      (2006.01)
(Continued)

(52) U.S. Cl.
CPC .............. *C02F 1/008* (2013.01); *C02F 1/78* (2013.01); *C02F 3/06* (2013.01); *C02F 2101/30* (2013.01);
(Continued)

(58) Field of Classification Search
None
See application file for complete search history.

(56) References Cited

U.S. PATENT DOCUMENTS

| | | |
|---|---|---|
| 2002/0104787 A1 | 8/2002 | Murayama |
| 2012/0080374 A1 | 4/2012 | Komor |
| 2015/0218011 A1* | 8/2015 | Zhu .......................... C02F 1/78 210/745 |

FOREIGN PATENT DOCUMENTS

| | | |
|---|---|---|
| DE | 4308159 | 9/1994 |
| JP | 04225896 | 8/1992 |

(Continued)

OTHER PUBLICATIONS

International Search Report and Written Opinion for International Application No. PCT/EP2015/060448, dated Aug. 11, 2015, 9 pages.

*Primary Examiner* — Hayden Brewster
(74) *Attorney, Agent, or Firm* — RatnerPrestia

(57) ABSTRACT

Method for controlling a water treatment installation having a supply, an ozonization stage, a transfer stage, a biological filter and a discharge having the following steps: measuring a first parameter set in the supply, wherein, a measurement for a first concentration of micro-contaminations and/or a nitrite concentration is determined; controlling the ozonization stage in such a manner that an ozone supply is carried out in a preselected ratio to the measured first parameter set; measuring a second parameter set in the transfer stage, wherein, a measurement for a second concentration of micro-contaminations is determined; controlling the ozo- (Continued)

Figure 1:
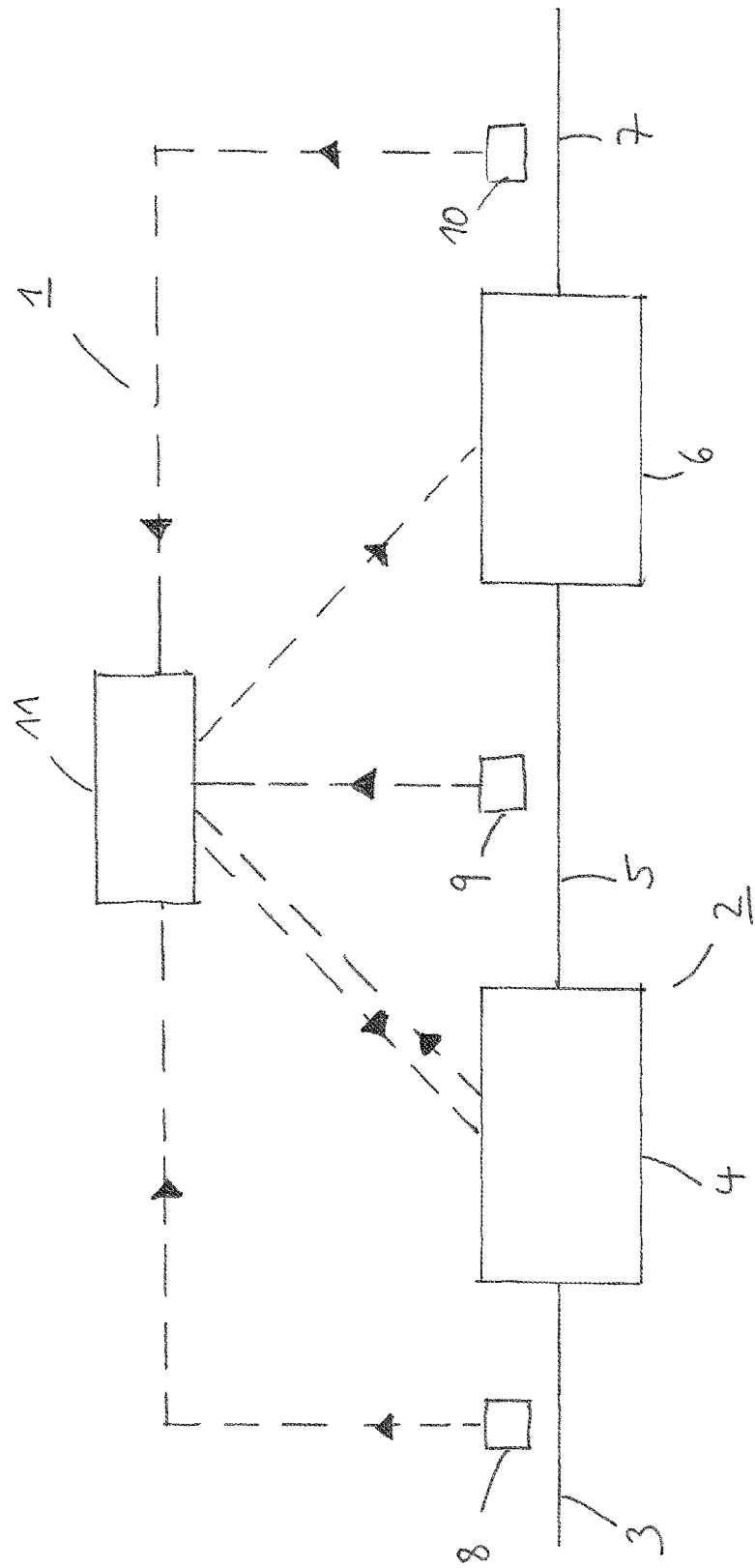

nization; measuring a third parameter set in the discharge, wherein, with reference to the third parameter set, a measurement of a third concentration of micro-contaminations is determined; if the measurement for the concentration of micro-contaminations exceeds a predetermined maximum value in the discharge, increasing the ozone supply.

9 Claims, 1 Drawing Sheet

(51) Int. Cl.
  *C02F 1/78* (2006.01)
  *C02F 3/06* (2006.01)
  *C02F 101/30* (2006.01)
(52) U.S. Cl.
  CPC ...... *C02F 2209/20* (2013.01); *C02F 2209/22* (2013.01); *C02F 2209/235* (2013.01); *Y02W 10/15* (2015.05)

(56) References Cited

FOREIGN PATENT DOCUMENTS

| | | |
|---|---|---|
| JP | 2005324124 | 11/2005 |
| WO | 2014025478 | 2/2014 |
| WO | 2014186167 | 11/2014 |

\* cited by examiner

REGULATING METHOD FOR A WATER TREATMENT INSTALLATION USING MEASURED PARAMETERS AND CONTROL OF AN OZONISATION DEVICE

CROSS-REFERENCE TO RELATED APPLICATIONS

This patent application is a U.S. National Phase Patent Application of PCT Application No. PCT/EP2015/060448, filed May 12, 2015, which claims priority to German Patent Application No. 102014010946.1, filed Jul. 28, 2014, each of which is incorporated by reference herein in its entirety.

FIELD OF THE INVENTION

The present invention relates to a method and a device for controlling a water treatment installation.

BACKGROUND OF THE INVENTION

In waste water treatment and drinking water preparation, in addition to disinfection, the reduction of disinfection by-products, the removal of nitrogen and phosphorus and the elimination of odours and flavourings, the elimination of micro-contaminations is becoming increasingly important.

Micro-contaminations are intended to be understood to be organic substances which occur in waters at concentrations in the range from a few nanograms to micrograms per liter and which at these concentrations can already influence the sequence of basic biochemical processes in nature. These include, on the one hand, many synthetic substances, such as medicaments, materials with biocidal properties, food additives, contents of cosmetics or cleaning agents, etcetera, but also materials of natural origin, such as, for example, hormones.

US 2012/0080374 A1 discloses a method for water treatment in which micro-contaminations are for the most part removed with an ozonisation operation and subsequent bioreactors or converted into non-problematic products. A control system of the method is not described.

DE 43 08 159 A1 discloses a method for decomposing the COD (Chemical Oxygen Demand) load in waste water in which an oxidation step with ozone is arranged upstream of a biological filter. The oxidation by means of ozone leads for the most part to a direct decomposition of the COD load and the remaining COD is changed in terms of its structure by the reactive ozone so that it can be decomposed by the biological filter. A control system of the waste water treatment is also not disclosed therein.

WO 2014/025478 A1 discloses a method for controlling a waste water treatment installation having an ozonisation action and a biological filter. In the discharge downstream of the filter, the TOC (Total Organic Carbon) of the waste water is measured using a sensor which detects the spectral absorption of electromagnetic radiation in the UV spectrum and/or in the visible spectrum and by means of an additional measurement of the oxidation/reduction potential. Using these two values, the ozone supply and where necessary the oxygen supply of the biological filter is/are subsequently controlled in order to obtain the desired water quality.

A significant cost factor of the above-mentioned installation combination of ozonisation and biological filters is the energy consumption of the ozone generator and the oxygen production. The ozone supply is consequently intended to be controlled in such a manner that in each case only the quantity of ozone required for the cleaning objective is produced and introduced. Additional factors which influence operating costs involve the operation of the biologically active filter (backwash intervals). It is therefore desirable with respect to optimisation of the costs to operate the installation combination in the most efficient manner possible.

SUMMARY OF THE INVENTION

An object of the present invention is to provide a method and a device for controlling a water treatment installation which achieve the desired water quality in the most cost-effective manner possible.

Accordingly, there is provided a method for controlling a water treatment installation having a supply, an ozonisation stage, a transfer stage, at least one biological filter and a discharge having the following method steps:

measuring a first parameter set in the supply by means of a fluorescence sensor or UV/Vis sensor, wherein, with reference to the first parameter set, a measurement for a first concentration of micro-contaminations and/or a nitrite concentration is determined; controlling the ozonisation stage in such a manner that an ozone supply is carried out in a preselected ratio to the measured first parameter set; measuring a second parameter set in the transfer stage by means of a fluorescence sensor or UV/Vis sensor, wherein, with reference to the second parameter set, a measurement for a second concentration of micro-contaminations is determined; controlling the ozonisation in such a manner that the quotient is produced from the difference of the first concentration of micro-contaminations and the second concentration of micro-contaminations in relation to the first concentration of micro-contaminations between a predetermined minimum value and a predetermined maximum value; measuring a third parameter set in the discharge by means of a fluorescence sensor or UV/Vis sensor, wherein, with reference to the third parameter set, a measurement for a third concentration of micro-contaminations is determined; if the third parameter set which comprises the measurement for the concentration of micro-contaminations exceeds a predetermined maximum value in the discharge, increasing the ozone supply.

As a result of this method, the desired reduction of micro-contaminations in the water is achieved with a cost-efficient ozone supply.

Preferably, with reference to the second and third parameter set, there is determined in each case a concentration of organic water contents from which the difference is calculated as the difference from the organic water contents in the transfer stage and the organic water contents in the discharge, wherein a cleaning step for the biological filter is carried out if the quotient falls below a predetermined minimum value. As a result of this control step, the efficiency of the filter is monitored and where applicable a cleaning step is initiated.

In an advantageous embodiment, all the sensors are UV/Vis sensors which absorb as a parameter set a UV/Vis absorption spectrum.

In this instance, it is preferable for the parameter set to comprise the UV/Vis absorption spectrum in the range from 200 to 700 nm.

In the first step of the control system, the nitrite concentration is preferably measured in addition, wherein the ozonisation is controlled in such a manner that there is supplied to the waste water flow in the ozonisation at least a quantity of ozone which corresponds to the quantity of nitrite in a ratio of 1:1.

Preferably, the concentration of organic water contents is measured as a TOC value. The TOC value is a measurement for the contamination of the water by the total organic carbon.

In a further preferred manner, with reference to the second parameter set, the dissolved quantity of ozone in the water is determined, wherein the ozone supply to the ozonisation is reduced if the dissolved quantity of ozone exceeds a predetermined maximum value. As a result of this step, the ozone supply can be subsequently controlled so that unnecessary overmetering of ozone can be prevented.

Preferably, the measurement for the concentration of micro-contaminations is determined with reference to at least one value selected from the group which comprises TOC, DOC and COD, wherein COD is a measurement for the chemical oxygen demand and DOM is a measurement for the dissolved organic materials. The micro-contaminations cannot be established directly by the UV/Vis absorption measurement. The absorption spectrum is characterised in accordance with the micro-contaminations and a conversion table is produced. To this end, the micro-contaminations are measured offline. With reference to these conversion tables, the measurement of the micro-contamination is determined online by means of evaluation of the absorption spectrum. In this instance, the correlation may be carried out, for example, with reference to known parameters, such as TOC, DOC, COD.

In a preferred embodiment, the water treatment installation is a waste water treatment installation for communal waste water.

There is further provided a device for controlling a water treatment installation having a supply, an ozonisation stage, a transfer stage, at least one biological filter and a discharge, wherein the device has in the supply a first fluorescence sensor or UV/Vis sensor which measures a first parameter set, wherein the first parameter set comprises a measurement for a first concentration of micro-contaminations and/or a nitrite concentration and has in the transfer stage a second fluorescence sensor or UV/Vis sensor which measures a second parameter set, wherein the parameter set comprises a measurement for a second concentration of micro-contaminations, and has in the discharge a third fluorescence sensor or UV/Vis sensor which measures a third parameter set, wherein the parameter set comprises a measurement for a third concentration of micro-contaminations and has a control and evaluation unit which controls the ozonisation in such a manner that the ozone supply is carried out in a pre-selected ratio to the measured parameter, wherein the ozone supply is metered in such a manner that the quotient of the difference of the first concentration of micro-contaminations and the second concentration of micro-contaminations in relation to the first concentration of micro-contaminations is adjusted between a predetermined minimum value and a predetermined maximum value.

In this instance, it is advantageous for the measurement for the concentration of micro-contaminations to be determined on the basis of at least one value selected from the group which comprises TOC, DOC and COD.

In addition, there may be provision for determining a concentration of organic water contents in each case from the measured parameter set in the transfer stage and in the discharge. These concentrations are then preferably further evaluated in the control and evaluation unit, in which the difference from the concentration of organic water contents in the transfer stage and the concentration of organic water contents in the discharge is calculated and the implementation of a cleaning step for the biological filter is initiated if the quotient of the difference and the concentration of organic water contents in the transfer stage falls below a predetermined minimum value. The operability of the filter can thus be monitored on the basis of the change of the concentration of organic water contents.

A preferred embodiment of the invention is explained in greater detail below with reference to the drawing.

BRIEF DESCRIPTION OF THE DRAWING FIGURES

FIG. 1 is a schematic illustration of a control circuit of a waste water treatment installation for communal waste water.

DETAILED DESCRIPTION OF THE INVENTION

FIG. 1 is a schematic illustration of a control circuit 1 of a waste water treatment installation 2 for communal waste water. The waste water treatment installation 2 has in the flow direction a supply 3, an ozonisation stage 4, a transfer stage 5, a biological filter 6 and a discharge 7. In the supply 3, in the transfer stage 5 and in the discharge 7, a sensor 8, 9, 10 is provided in each case. The sensors 8, 9, 10, which are used in this instance and which detect the spectral absorption of electromagnetic radiation in the UV spectrum and/or in the visible spectrum and which are consequently particularly sensitive to different contents of the waste water, are mentioned below in accordance with the technical terminology in this field "UV/Vis sensors". The UV/Vis sensor absorbs at the same time a complete absorption spectrum. Via a mathematical evaluation of the spectra, a statement can be obtained in relation to current sum parameters, such as TOC, COD, DOC, and specific parameters, such as nitrite. Furthermore, the selected spectrum evaluation enables a more precise statement relating to the reactions of the organic water contents which have been carried out with ozone and radicals. From this reaction, conclusions can be drawn relating to the reaction of the ozone with the micro-contaminations. Consequently, the operation of the ozone which has been introduced can be tracked for the control in accordance with the present invention.

The first UV/Vis sensor 8 which is arranged in the supply 3 is configured to simultaneously detect 256 selected wavelengths in the spectrum from 200 to 700 nm. The measurement for a first concentration of micro-contaminations, the total of the organic water contents, for example, in the form of TOC and the nitrite concentration of the water before the waste water treatment can be determined therefrom. The absorbed spectrum characterises the water which is intended to be treated and enables the statement of an initial dose for the ozone supply. This initial situation which has been established in this manner is specific for each water and changes with variations of the water composition during operation of the water treatment installation. The measured values are transmitted to an evaluation and control unit 11 which, using predetermined data, determines an ozone dose which is suitable for the measured water matrix. The calculated ozone dose is transmitted to the ozone stage and the corresponding ozone supply is initiated.

The ozone in the ozone stage reacts in the water directly with a large number of inorganic and organic substances. A portion of the ozone disintegrates in the water in the presence of organic carbon and hydroxide ions into radicals which react very quickly with different substances. In spite of their short useful lives and the low concentration, they can contribute substantially to the elimination of micro-contaminations. Nitrite which is present reacts with ozone to form nitrate. A high nitrite content increases the ozone demand and consequently the energy consumption and the costs. According to the measured nitrite concentration in the supply, therefore, the ozone supply has to be increased so that it can be safely assumed that there is available sufficient ozone for the elimination of micro-contaminations or TOC. In the transfer stage 5 a second UV/Vis sensor 9 is configured to absorb the absorption spectrum again for the previously defined wavelengths after the ozonisation 4. In the evaluation and control unit 11, the difference between the absorption spectra before and after the ozone supply in relation to the absorption spectrum in the supply is established. The measured absorption for the respective wavelengths changes as a result of the addition of ozone to the water. With the increase of the ozone supply, the absorption lines decrease in the spectrum. The level of the reduction of the individual lines for a specific ozone metering differs. The observed change of the line spectrum reflects the different reaction of the ozone with the water contents. This change also correlates to the decomposition of the micro-contaminations and can therefore be converted into a measurement for a change of the concentration of micro-contaminations. In order to determine the correlation, the dependency of the change of the spectrum on the change of the concentration of the micro-contaminations is measured offline beforehand. This data set acts as a basis for the present method. One possibility is to determine the change of concentration of the micro-contaminations in accordance with TOC for the data set. The necessary ozone supply in order to achieve the treatment target is monitored via the change of the absorption spectrum. For a specific cleaning objective, the ozone metering is controlled in such a manner that a predetermined change in % reduction of the overall absorption is achieved. For micro-contaminations which can be more readily decomposed, such as, for example, carbamazepine and diclofenac, the maximum reduction may be in the range of a reduction of from 20 to 60% of the absorption. For materials which are harder to decompose, such as, for example, benzotriazole, this may be in the range from 40 to 80%. An ozone supply to decompose micro-contaminations is advantageous only until the maximum reduction of the material which is intended to be decomposed or the overall absorption has been reached. Furthermore, there is produced no significant trace material decomposition of the material which is intended to be decomposed. In order to maintain an optimised ozone consumption, it is important not to exceed this point. By means of variation of the ozone metering, this value can be adjusted in a desired range. As the ozone metering increases, the difference of the absorption spectra in relation to the absorption spectrum in the supply moves closer, for instance, in an asymptotic manner towards the desired reduction. In this instance, an optimal ozone metering is achieved when the elimination of the trace materials in a range is located slightly before the transition into the asymptotic portion.

Downstream of the transfer stage 5, the water reaches the biological filter installation 6 in a downstream direction. The filter installation 6 has a plurality of objectives to achieve. The mechanical filter properties lead to the retention of cloudy substances and particles. As a result of the specific operating method of the system, the filter also acts as a bioreactor. A bioreactor has microorganisms which are cultivated under the most optimum conditions possible. Furthermore, adsorption effects also act in the filter. In this instance, dissolved water contents are adsorbed in the filter materials. As a result of these different filter properties, the filter contributes to the continued decomposition of organic water contents and other non-desirable by-products (for example, NDMA).

The second UV/Vis sensor 9 which is arranged in the transfer stage 5 measures the overall absorption spectrum from 200 to 700 nm. From the spectrum, the ozone content in the water is determined by means of analysis of the UV absorption spectrum at from 220 to 350 nm. As a result of the optimisation of the portion of the control circuit already described, it may be anticipated that the ozone dose is so low that there is no longer any dissolved ozone in the supply of the filter bed. The measured ozone dose is transmitted to the control and evaluation unit 11 and processed at that location. If the ozone dose is too high, an adaptation of the ozone supply can be carried out.

For the use in the filter installation, a large number of different filter materials with different functions are suitable. The filter bed retains particulate solid materials and allows the filtrate through. The organic substances which have been split by the ozone in the ozonisation are mineralised to the greatest possible extent by aerobic bacteria in the ozone-free environment of the filter bed. For the biological mineralisation, special accordingly sized activated carbon filters or multi-layer filters are generally used.

The filter capacity of the filter installation 6 may decrease over time since the filter becomes clogged, for example. In order to clean the filter, for example, it is flushed free with water. The flushing of the filter is application-specific. In this instance, a modified flushing comprising air, air and water or water is provided. The control unit of the filter may imitate different flushing programs. These are provided by the overall control concept.

In order, inter alia, to monitor the capacity of the filter 6, a third UV/Vis sensor 10 is provided in the discharge 7. The third UV/Vis sensor 10 measures the concentration of trace materials by absorbing an absorption spectrum, for example, of organic water contents downstream of the biological filter and transmits the value to the control and evaluation unit. There, the difference of the absorption spectra upstream and downstream of the filter is established in relation to the absorption spectrum in the transfer stage. This value represents the efficiency of the biological filter. If the efficiency falls below a specific value, a cleaning of the filter is initiated. The cleaning step may comprise an adapted flushing program of the filter and/or other cleaning methods, such as, for example, a change of the ozone supply. For the filter operation, the differential pressure in the filter bed and the presence of cloudy materials and particles in the form of TSS and NTU upstream and downstream of the filter is further typically monitored.

Furthermore, the absorption spectrum in the discharge 7 is monitored by means of the third sensor 10. The evaluation and control unit 11 compares in this instance the concentration established from the spectrum, for example, in terms of organic water contents in the form of TOC with a predetermined desired range and can in the event of an excessively high concentration, for example, increase the ozone supply in the ozonisation stage.

There may also be provision to use the fluorescence sensors thereof in order to measure at least some of the parameters.

In special cases, in particular during the preparation of drinking water, it may be necessary, in addition to the ozone, to meter an activating chemical, such as, for example, $H_2O_2$. The metering, for example, of $H_2O_2$ would generally be implemented in the following manner in the control concept.

An optional $H_2O_2$ metering may be switched on in the program. The necessary $H_2O_2$ metering quantity is adapted by the program to the established ozone quantity by means of a predetermined ratio of ozone/$H_2O_2$. Since in the discharge no $H_2O_2$ is desired, control measurements are provided in the transfer stage 5 and in the discharge of the filter.

The method and the device for control can also be used to prepare drinking water using ozone biofiltration.

The control according to the invention of the water treatment installation serves to optimise costs but also the method and operational reliability. The water treatment installation can, using the control according to the invention, compensate for matrix fluctuations, prevent potential ozone overmetering, monitor the efficiency of the biological filter and prevent the penetration of ozone into the discharge. In this instance, as a result of the control, the optimum operating point of the installation can be adjusted so that the desired water quality is achieved in the most cost-effective manner possible. Without such a control concept, in practice more operating medium (for example, quantity of ozone) than necessary is often used for safety reasons. For an operator, achieving the cleaning objective is in practice the top priority. In order to achieve this in a reliable manner, without knowledge of the cleaning operation, excessive metering is then generally carried out, which leads to increased operating costs. The newly developed control concept can contribute to a saving of up to 50% of the operating costs.

The control according to the invention enables selective metering of the ozone quantity in order to achieve a specific cleaning action. The cleaning action may relate to the decomposition of trace materials and to achieving other cleaning objectives, such as disinfection. Furthermore, this type of control of the ozone metering also enables control of the production of undesirable by-products, such as, for example, bromate.

The invention claimed is:

1. A method for controlling a water treatment installation having, in a flow direction, an ozonisation device for receiving a waste water supply and ozonisating the waste water supply, a transfer device downstream of the ozonisation device, at least one biological filter downstream of the transfer device, and a discharge device downstream of the at least one biological filter, said method having the following method steps:
   1.1. measuring a first parameter set in the waste water supply at a location upstream of the ozonisation device by a first sensor;
   1.2. determining a first concentration of micro-contaminations (c1) or a nitrite concentration (n1) based upon the measured first parameter set;
   1.3. controlling the ozonisation device to carry out an ozone supply in a preselected ratio to the measured first parameter set (c1, n1);
   1.4. measuring a second parameter set in the transfer device by a second sensor;
   1.5. determining a second concentration of micro-contaminations (c2) based upon the measured second parameter set;
   1.6. controlling the ozonisation device to produce a quotient (c1−c2)/c1 that is a difference between the first concentration of micro-contaminations (c1) and the second concentration of micro-contaminations (c2) in relation to the first concentration of micro-contaminations (c1) between a predetermined minimum value and a predetermined maximum value;
   1.7. measuring a third parameter set in the discharge device by a third sensor at a location downstream of the at least one biological filter;
   1.8. determining a third concentration of micro-contaminations (c3) based upon the measured third parameter set; and
   1.9. increasing the ozone supply in step 1.2 if the third parameter set, which comprises the measurement for the third concentration of micro-contaminations (c3), exceeds a predetermined maximum value in the discharge device,
   wherein each sensor is either a fluorescence sensor or a UV/Vis sensor.

2. The method according to claim 1, wherein, with reference to the second and third parameter set, there is determined in each case a concentration of organic water contents (c4, c5) from which a difference delta (c4, c5) is calculated as a difference from organic water contents c4 in the transfer device and organic water contents c5 in the discharge device, wherein a cleaning step for the biological filter is carried out if a quotient delta (c4, c5)/(c4) falls below a predetermined minimum value.

3. The method according to claim 1, wherein the sensors are UV/Vis sensors which absorb as a parameter set a UV/Vis absorption spectrum.

4. The method according to claim 3, wherein the parameter set comprises the UV/Vis absorption spectrum in a range from 200 to 700 nm.

5. The method according to claim 1, wherein, in step 1.2, the first concentration of micro-contaminations (c1) and the nitrite concentration (n1) are determined based upon the measured first parameter set, and the nitrite concentration (n1) in the ozonisation is controlled in such a manner that there is supplied to a waste water flow in the ozonisation at least a quantity of ozone which corresponds to a quantity of nitrite in a ratio of 1:1.

6. The method according to claim 2, wherein the concentration of organic water contents (c4, c5) is measured as a total organic carbon (TOC) value.

7. The method according to claim 1, wherein, with reference to the second parameter set, a dissolved quantity of ozone in the water is determined, wherein the ozone supply is reduced in step 1.2 if the dissolved quantity of ozone exceeds a predetermined maximum value.

8. The method according to claim 1, wherein the measurement for the concentration of micro-contaminations (c1, c2, c3) is determined with reference to at least one value selected from the group which comprises TOC, dissolved organic carbon (DOC) and chemical oxygen demand (COD).

9. The method according to claim 1, wherein the water treatment installation is a waste water treatment installation for communal waste water.

* * * * *